United States Patent
Heidloff et al.

(10) Patent No.: US 7,720,921 B2
(45) Date of Patent: May 18, 2010

(54) SYSTEM AND METHOD FOR SOLICITING AND RETRIEVING A COMPLETE EMAIL THREAD

(75) Inventors: Niklas Heidloff, Salzkotten (DE); Shruti Kumar, Littleton, MA (US); Michael R. O'Brien, Westford, MA (US); Patrick J. O'Sullivan, Ballsbridge (IE)

(73) Assignee: International Business Machines Corporation, Armonk, NY (US)

( * ) Notice: Subject to any disclaimer, the term of this patent is extended or adjusted under 35 U.S.C. 154(b) by 288 days.

(21) Appl. No.: 11/845,255

(22) Filed: Aug. 27, 2007

(65) Prior Publication Data

US 2009/0063636 A1 Mar. 5, 2009

(51) Int. Cl.
*G06F 15/16* (2006.01)
*G06F 3/048* (2006.01)
(52) U.S. Cl. .................. 709/206; 715/846; 715/744; 709/204
(58) Field of Classification Search .......... 709/206, 709/204; 715/846, 744
See application file for complete search history.

(56) References Cited

U.S. PATENT DOCUMENTS

| | | | | |
|---|---|---|---|---|
| 5,905,863 | A * | 5/1999 | Knowles et al. | 709/206 |
| 6,769,012 | B1 * | 7/2004 | Liu et al. | 709/204 |
| 7,185,058 | B2 * | 2/2007 | Blackwell et al. | 709/206 |
| 7,454,414 | B2 * | 11/2008 | Schirmer et al. | 707/3 |
| 7,487,216 | B2 * | 2/2009 | Miller et al. | 709/206 |
| 2002/0133554 | A1 * | 9/2002 | Checkoway et al. | 709/206 |
| 2003/0233410 | A1 * | 12/2003 | Gusler et al. | 709/206 |
| 2004/0054737 | A1 | 3/2004 | Daniell | |
| 2004/0141004 | A1 | 7/2004 | Cabezas et al. | |
| 2004/0215947 | A1 | 10/2004 | Ward, III et al. | |
| 2004/0230659 | A1 * | 11/2004 | Chase | 709/206 |
| 2006/0031349 | A1 * | 2/2006 | Bailey et al. | 709/206 |
| 2006/0161849 | A1 * | 7/2006 | Miller et al. | 715/744 |
| 2006/0206569 | A1 * | 9/2006 | Heidloff et al. | 709/206 |
| 2006/0248151 | A1 * | 11/2006 | Belakovskiy et al. | 709/206 |
| 2007/0061278 | A1 * | 3/2007 | Schirmer et al. | 707/1 |
| 2007/0143425 | A1 * | 6/2007 | Kieselbach et al. | 709/206 |
| 2007/0143428 | A1 * | 6/2007 | Kumar et al. | 709/206 |
| 2007/0150541 | A1 * | 6/2007 | Carroll et al. | 709/206 |
| 2007/0250576 | A1 * | 10/2007 | Kumar et al. | 709/206 |
| 2007/0282922 | A1 * | 12/2007 | Bohannon et al. | 707/202 |
| 2008/0082609 | A1 * | 4/2008 | O'Sullivan et al. | 709/204 |
| 2008/0098070 | A1 * | 4/2008 | Heidloff et al. | 709/206 |
| 2008/0104183 | A1 * | 5/2008 | Eldering | 709/206 |
| 2008/0114636 | A1 * | 5/2008 | Nellutla | 705/9 |
| 2008/0120383 | A1 * | 5/2008 | Kumar et al. | 709/206 |
| 2008/0294727 | A1 * | 11/2008 | Moody et al. | 709/206 |
| 2008/0294730 | A1 * | 11/2008 | Oral et al. | 709/206 |

(Continued)

*Primary Examiner*—Alina N. Boutah
(74) *Attorney, Agent, or Firm*—Raymond Szeto; Hoffman Warnick LLC

(57) ABSTRACT

A system and method allows an email user to solicit an email thread from another user (or from a server) in situations where the first requesting user may have been added to an email thread after the email thread was started, or in situations where the user may have an incomplete thread (for example, where a user is being added to a thread where an attachment was removed). The complete thread is returned to the first requesting user, after permission has been sought and granted, and after data mining and intelligent aggregation of a plurality of relevant threads in to one interleaved result is performed and returned to the first requesting user.

4 Claims, 8 Drawing Sheets

U.S. PATENT DOCUMENTS

2008/0295000 A1* 11/2008 Kieselbach et al. ......... 715/752
2009/0006558 A1* 1/2009 Taieb et al. ................. 709/206
2009/0055186 A1* 2/2009 Lance et al. ................. 704/260

* cited by examiner

SYSTEM AND METHOD FOR SOLICITING AND RETRIEVING A COMPLETE EMAIL THREAD

FIELD OF THE INVENTION

The present invention relates generally to email and, more specifically, to a system and method for soliciting and retrieving a complete email thread.

BACKGROUND OF THE INVENTION

Situations often arise where an individual may have been added to an email thread late (and have missed earlier parts of the thread), or a user may have an incomplete thread (for example, if a user has been added to a thread where an attachment was removed).

The present art, such as IBM's IWMC (IBM® Workplace Managed Client) and other browser clients such as MSN's Hotmail®, Google's GMail, Yahoo® Mail, do not solve this problem of identifying threads on the specific topic of thread solicitation, aggregation, merging, or returning incomplete threads.

There is currently a need for a system and method to allow such a user to solicit and receive a complete thread from another user when permission has been sought and granted.

BRIEF SUMMARY OF THE INVENTION

The system and method of the present invention allows an email user to solicit an email thread from another user (or from a server) in situations where the first requesting user may have been added to an email thread after the email thread was started, or in situations where the user may have an incomplete thread (for example, where a user is being added to a thread where an attachment was removed). The complete thread is returned to the first requesting user, after permission has been sought and granted, and after data mining and intelligent aggregation of a plurality of relevant threads in to one interleaved result is performed and returned to the first requesting user.

The illustrative aspects of the present invention are designed to solve one or more of the problems herein described and/or one or more other problems not discussed.

BRIEF DESCRIPTION OF THE SEVERAL VIEWS OF THE DRAWINGS

These and other features of the invention will be more readily understood from the following detailed description of the various aspects of the invention taken in conjunction with the accompanying drawings that depict various embodiments of the invention, in which.

The drawings are intended to depict only typical aspects of the invention, and therefore should not be considered as limiting the scope of the invention. In the drawings, like numbering represent like elements between the drawings.

DETAILED DESCRIPTION OF THE PREFERRED EMBODIMENT OF THE PRESENT INVENTION

The present invention provides system and method for soliciting and retrieving a complete email thread.

Figure 1:
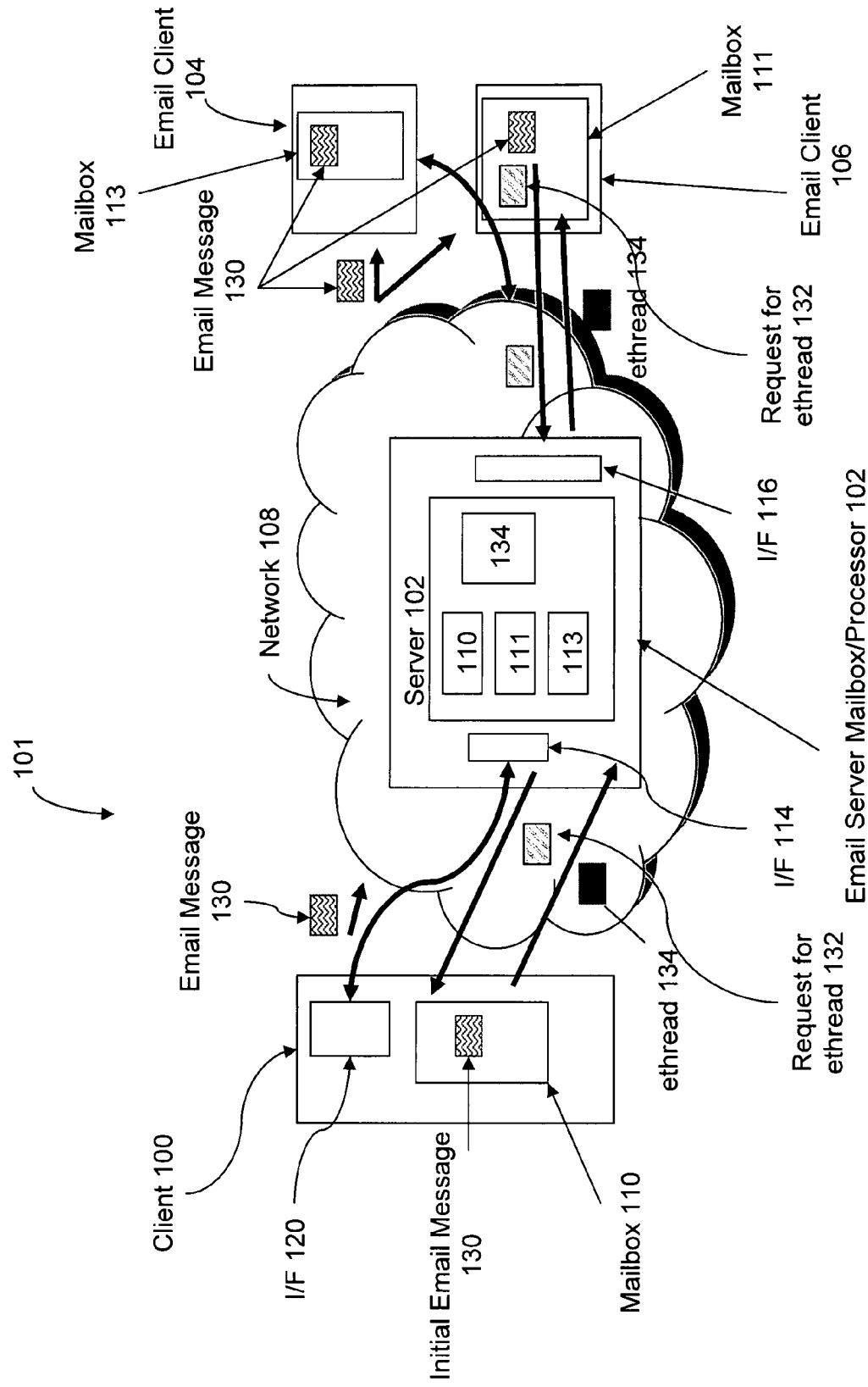
FIG. 1 depicts the email system of the present invention.

In FIG. 1, Email System 101 is shown to illustrate this point. Email System 101 has Email Client 100, Email Server 102 and Email Clients 104 and Email Client 106. Of course, many more email clients could be connected through Email Server 102 and many more email servers interconnected within Network 108. Email Client 100 communicates with Email Client 104 and Email Client 106 through Email Server 102 and, in this example, in an email communication. Of course, the clients could be communicating via text messaging—TM—or instant messaging—IM. Alternatively, Email Client 100 and Email Clients 104, 106 may be connected directly for email communication in a "peer to peer" configuration. Email Server 102 is shown within a Network 108 which may be of the many various forms such as Internet, local area network (LAN), MAN, etc. Email Server 102 has an Interface (I/F) 114 and I/F 116 for interfacing with Email Clients 100, 104, 106 (and others). Email Server 102 further has an Email Mailbox/Processor 118 for processing and storing email communications between Email Client 100 and Email Clients 104, 106. This can be seen as Email Server 102 has Mailbox Components 110, 111, and 113.

Email Client 100 has an I/F 114 for interfacing with the Network 108 and Email Server 102. Likewise, Email Clients 104, 106 have interface components for interfacing with the Network 108 and Email Server 102. Email Client 100 has a Mailbox Component 110 for providing email communications 130 with Email Clients 104, 106 through the Network 108 and Email Server 102 and for storing received emails. Likewise, Email Clients 104, 106 each has a Mailbox Component 113, 111 for providing email communications 130 with Email Client 100 through the Network 108 and Email Server 102.

The Mailbox Components 110, 111 and 113 of Email Clients 100, 104, 106 correspond to the Mailbox Components of Email Server 102 and, for some applications, the Server Mail Components replicate to the Client Mail Components so that the Client Mail Components are local to the user.

In the course of an email "discussion", or thread, an Email Message 130 is sent to a number of parties such as Email Clients 104, 106. Email Client 104 "replies to all" with a Reply to All Message so that it is sent to all of the initial recipients and the initial sender. This creates an email thread which is characterized by a common sender/recipient list. This, of course, can occur many times causing lots of activity at a user's mailbox.

Sometimes, situations arise where an individual may have been added to an email thread later then when the email thread has begun (and the later added individual have missed earlier parts of the thread), or a later added individual may have an incomplete thread (for example, being added to a thread where an attachment was removed). The system and method of the present allows such a later added individual to solicit, or request, and receive a complete thread from the system or another user when permission has been sought and granted.

The system and method of the present invention allows an individual to solicit an email thread from another user in situations where this individual may have been added to an email thread late (and have missed earlier parts of the thread), or in situations where the user may have an incomplete thread (e.g., being added to a thread where an attachment was removed). The complete thread is returned when permission has been sought and granted, and after data mining and intelligent aggregation of a plurality of relevant threads in to one interleaved result is performed and returned to the requester.

For instance, Email Client 106 is added to an email thread in which the thread is incomplete (missing history, missing attachments, etc.). Email Client 106 identifies any individual on the thread (or number of individuals), such as Email Client 100, and, with a simple UI selection, solicits a request for a Complete Thread 132 (utilizing a "Request Thread" button located on Email Client's 106 UI). The request is transferred to the other individuals as a request that results in a message on the opposite side "Joe Bloggs has requested a complete thread on Mail XYX". A link is embedded in the thread which the remote user (Email Client 100) can use to establish the thread that Email Client 106 is soliciting. Embedded in the request is a dialogue with a "I agree", "I agree with comments", "I decline", "I decline with comments", and "Ignore" option. Options are also available to "Return the complete thread", "Return the complete instance of the specific part of the thread identified (which would usually mean an attachment)". Once the remote user (Email Client 100) agrees or agrees with comments a data mining process kicks off on the mail server (Email Server 102) and parses out the complete thread from the remote user's (Email Client's 100) mail box. The complete thread is sent to the Email Client 106 along with any comments from the remote user (Email Client 100).

If the remote user (Email Client 100) agrees to return a complete thread for the specific_instance of the solicited thread then:
  the data mining process that runs server side (Email Server 102) locates all instances of this thread (all available parent and child threads);
  an intelligent thread aggregation process analyses the various threads and interleaves all threads in to one date-ordered thread, at the same time eliminating any unnecessary duplication; and
  the final thread returned to Email Client 106 is complete and free of duplicates.

If the remote user (Email Client 100) agrees to return a complete thread and all possible spin-off branches associated with this thread:
  the data mining process, which runs server side (Email Server 102), locates all instances of this thread as well as all spin-off branches;
  an intelligent thread aggregation process analyses the various threads and provides a chronological sort order by branch that is returned to the requesting user (Email Client 106). For example, in IBM's Lotus Notes® email client, this could be done using on the first level sections for all branches/leaves of the thread and then subsections with the mails of the branches. Yet another embodiment is to send one mail per branch, where all mails are encapsulated in a tree whose parent title describes the requesting user's (Email Client's 106) request, and wherein the various threads and branches reside; and
  the entire tree (parent+all child branches comprising all spin off threads) are returned to Email Client 106 as complete.

In the preferred embodiment of the present invention, the system and method allows that a requesting user (Email Client 106) may solicit for an email thread and responses are processed as conventional email requests, and routed to mailboxes. The system and method allows that when a solicit request is opened that the email is flagged in a unique way (a special kind of email in the way that a To Do is a special kind of email, and a Calendar entry is a special kind of email) such that a trigger event is activated to permit an accept/reject response that is managed by motivating a basic UI with preferences (described above) that the remote user can select. Once the remote user (Email Client 100) affirms, a process running on the mail server (Email Server 102) receives a new event in a queue on which to act, and which has the access control to mine the remote user's mail file for relevant threads. The interleaving and removal of redundant information from the thread prior to queuing the thread up for outbound delivery can also be handled by this same process.

The system and method of the present presents a second user with a UI that allows her to forward the complete instance of the "current" thread, as well as the ability to forward a complete thread and all possible spin-off branches associated with this thread. The content forwarded and received (single thread instance or parent with child threads as branches representing spin-off threads).

Figure 2:
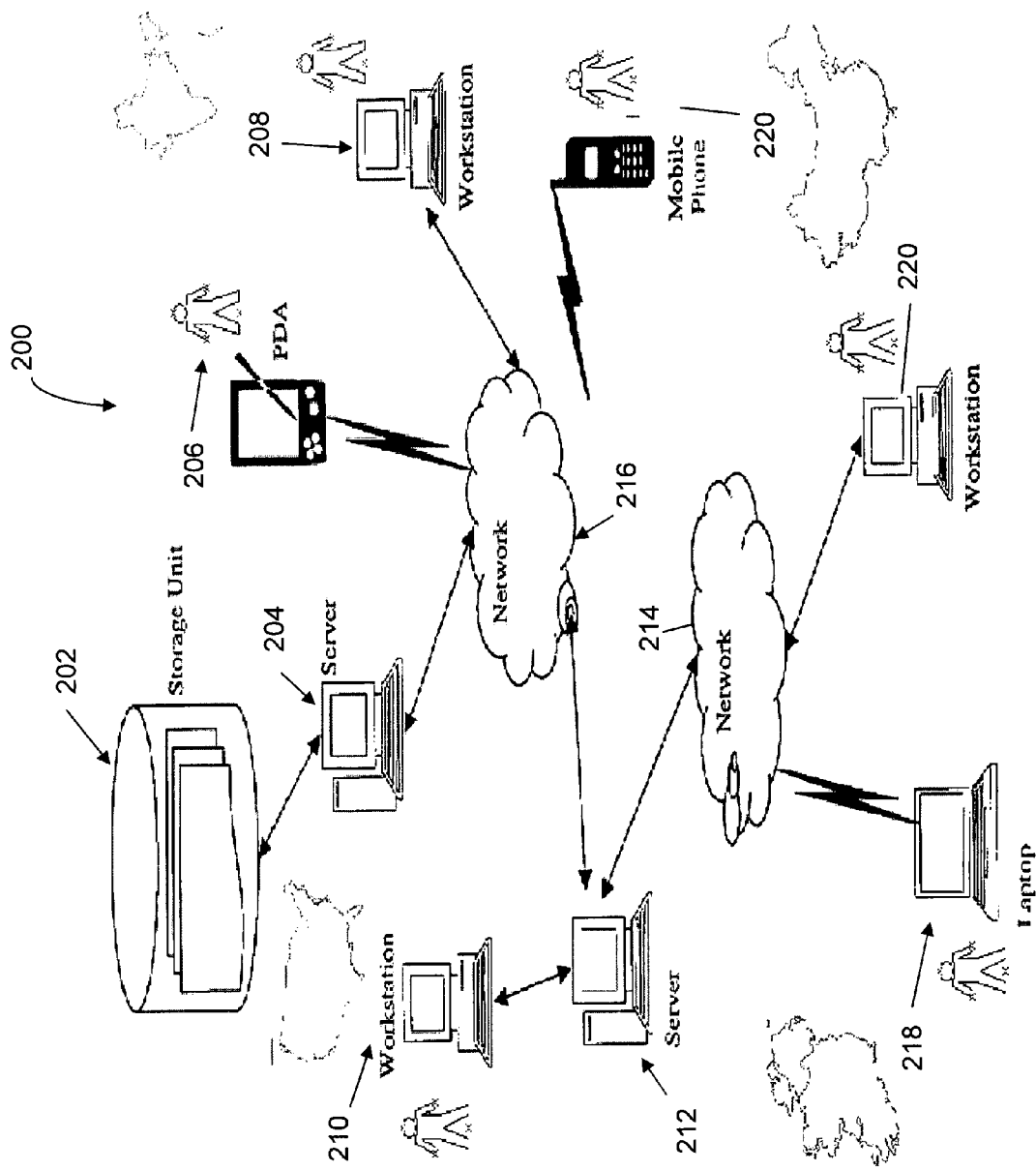
FIG. 2 illustrates the system of the present invention having a storage unit for storing an email thread.

FIG. 2 illustrates the system 200 of the present invention having a storage unit 202 for storing an email thread. Users 206, 208, 210, 218, 218 and 220 can utilize a workstation, a lap top computer, a cell phone, a personal digital assistant or other devices to communicate with one another through networks 214, 216.

Figure 3:
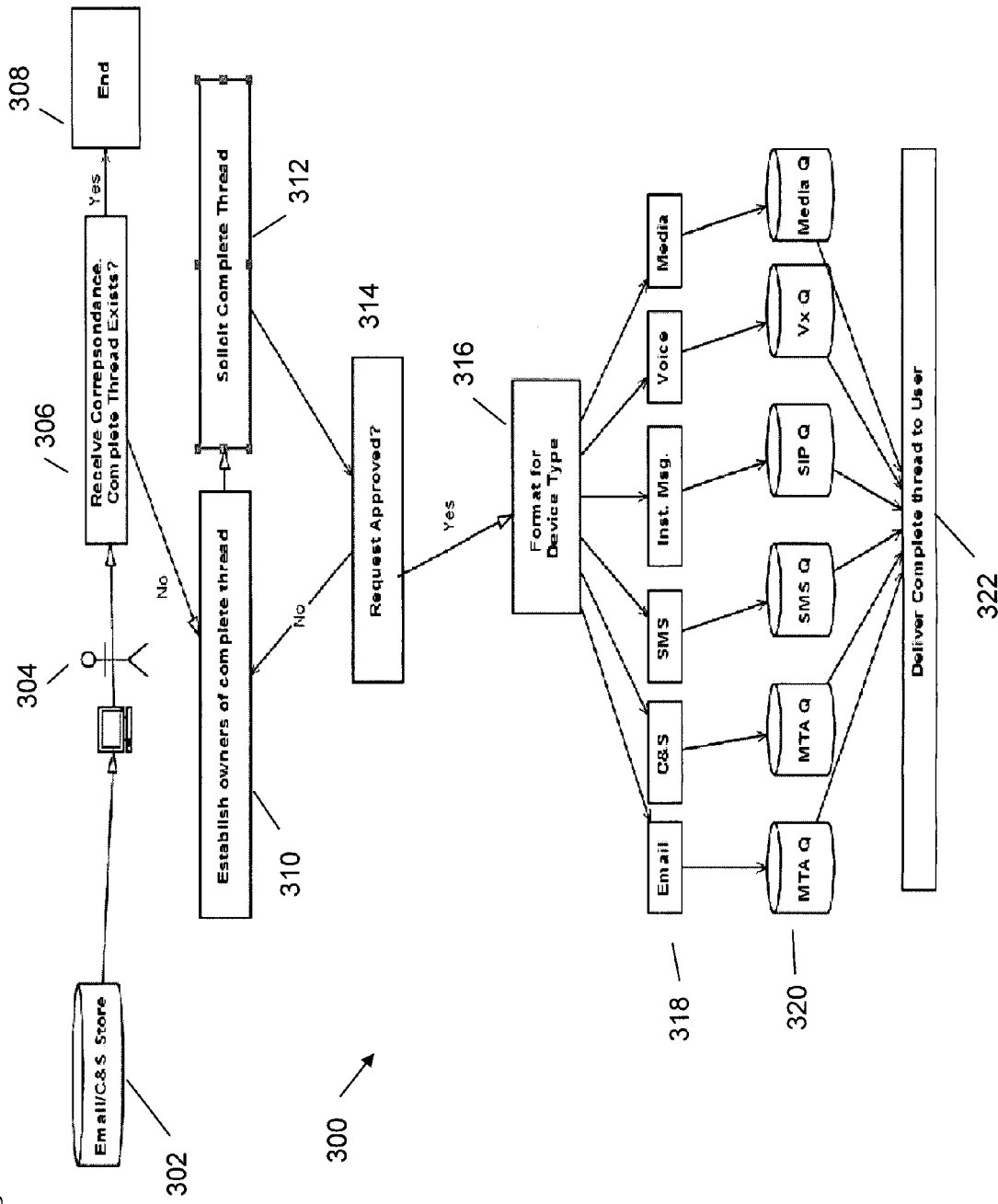
FIG. 3 illustrates the system and method of the present invention having an email storage area such that a user may send emails and retrieve threads.

FIG. 3 illustrates the system and method 300 of the present invention having an email storage area 302 such that a user 304 may send emails and retrieve ethreads. At 306, user 304 requests an thread and the system and method of the present invention determines whether the user is authenticated and whether a thread exists. If not, the process ends at 308. If so, at 310, the system determines the owner(s) of the thread and, at 312, requests approval of passing on the thread. If approved, at 314, at 316, the format of the device is determined and is passed to the various adapters 318 and is stored in storage devices 320 and is delivered to user via delivery mechanism 322.

Figure 4:
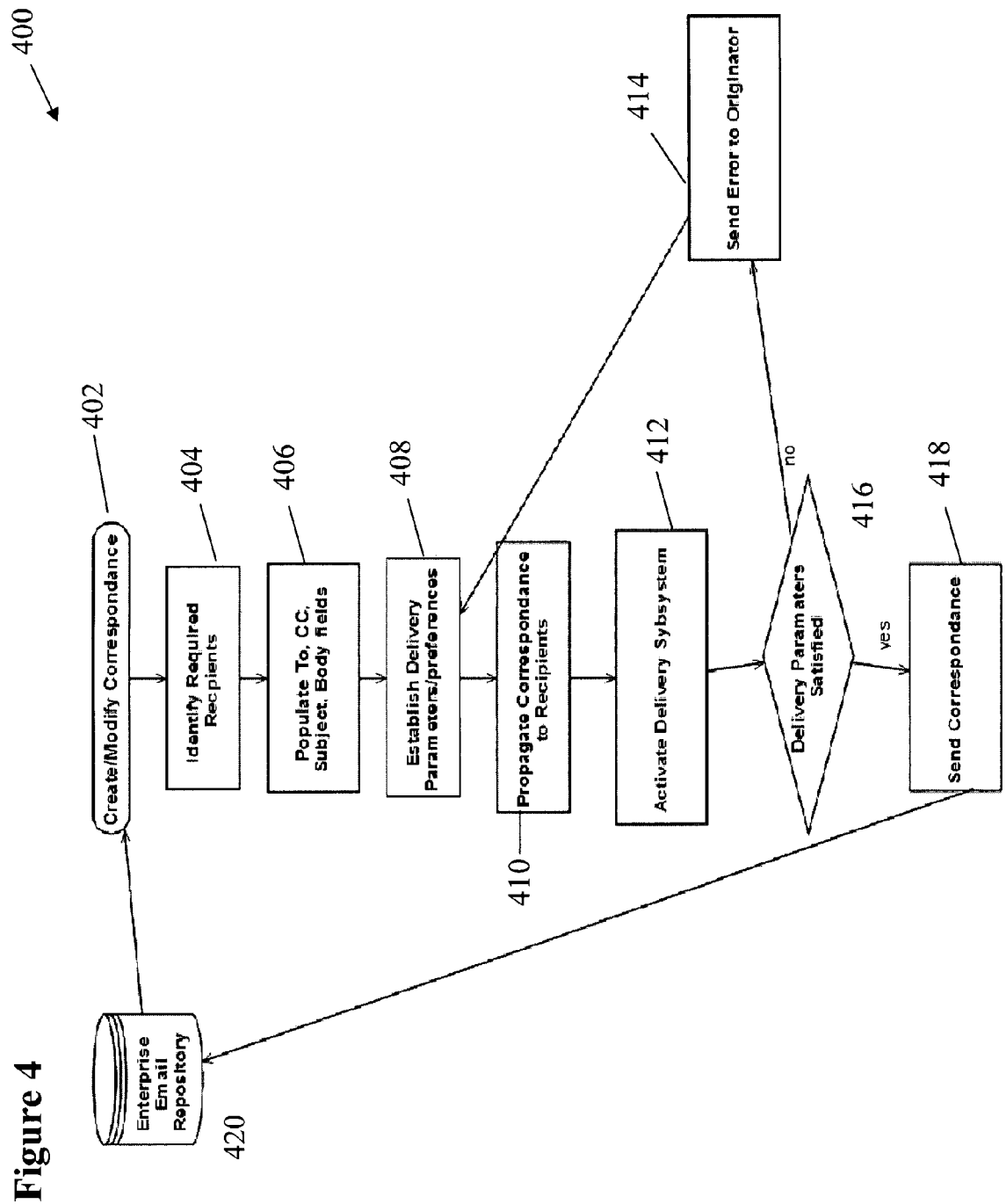
FIG. 4 illustrates the system and method of the present invention having an email storage area such that a user may send emails and retrieve threads.
Figure 5:
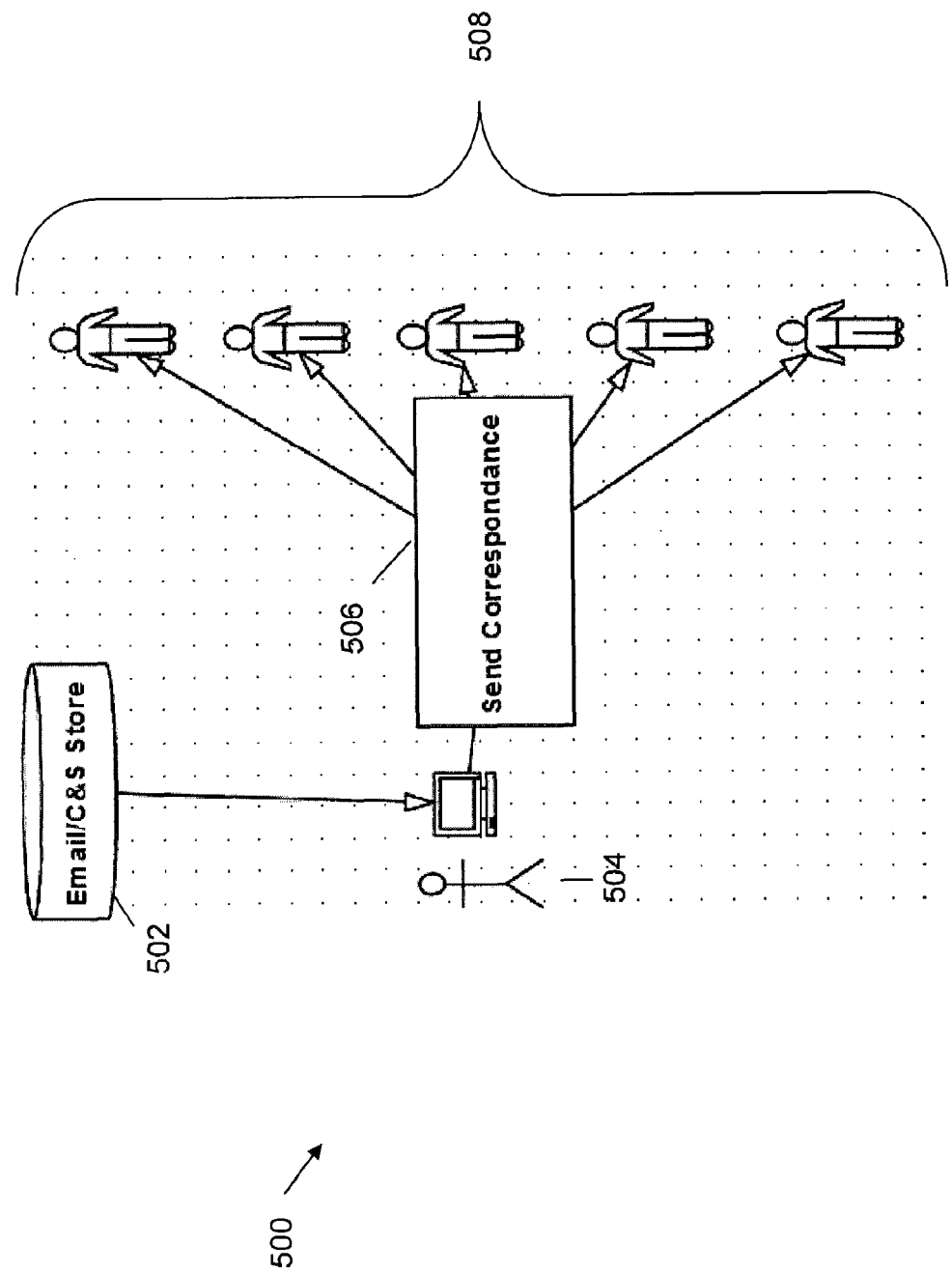
FIG. 5 illustrates the system and method of the present invention for sending correspondence to other users.

FIG. 4 illustrates the system and method 400 of the present invention having an email storage area 420 such that a user may send emails and retrieve ethreads. At step 402, the method determines whether there has been a request for a creation or a modification of a thread. At step 404, the system and method determines the required parties. At step 406, the method populates the various fields of the email such as the CC, Subject or Body fields. At step 408, the system and method establishes the delivery parameters. At step 410, the system and method conveys the correspondence to the recipients. This is shown in FIG. 5 (508). At step 412, the system and method activates the delivery subsystem. At step 416, the system and method determines whether the delivery parameters have been satisfied. If not, at step 414, an error message is sent to the originator. If so, the thread is conveyed to the requestor.

Figure 6:
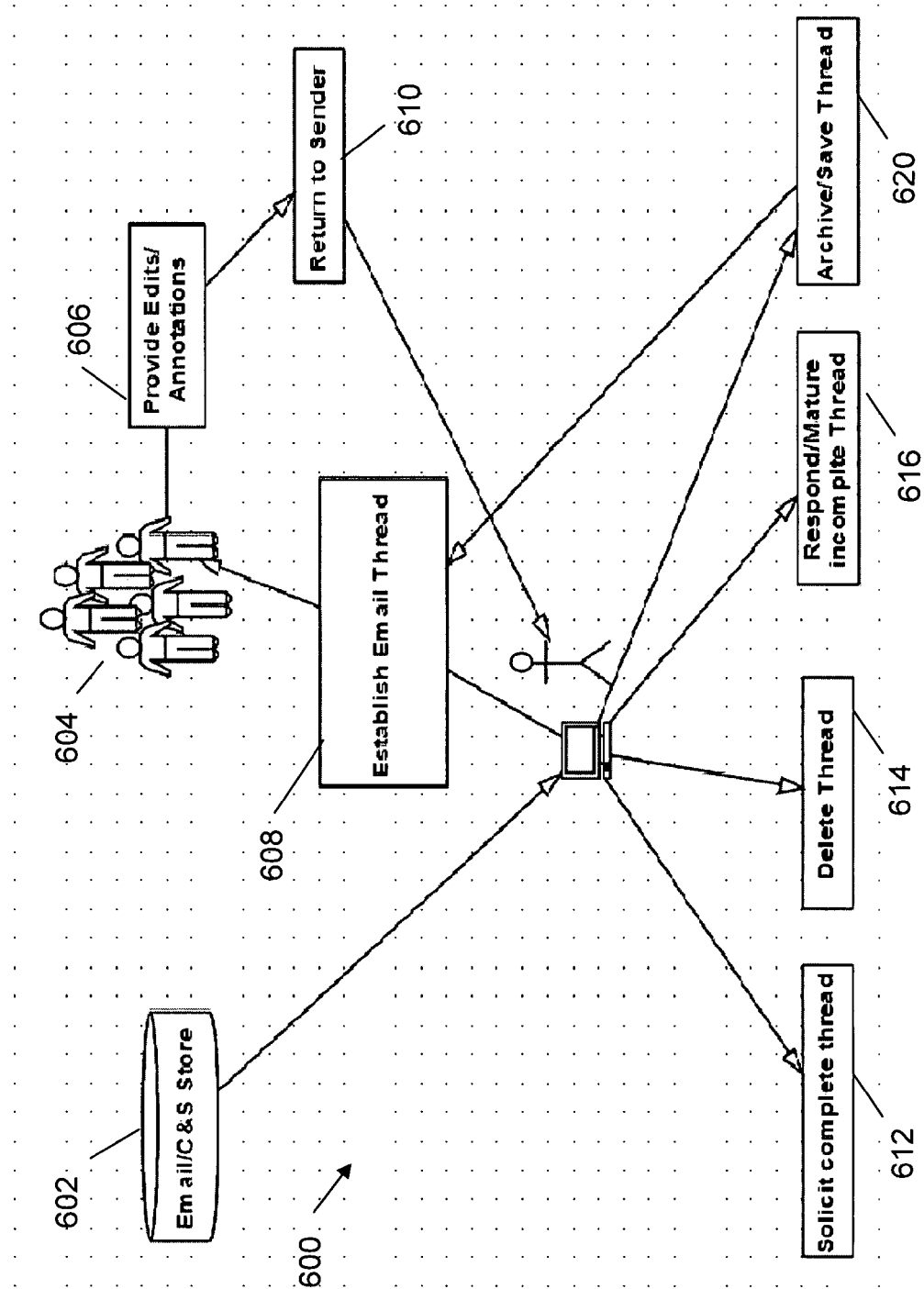
FIG. 6 illustrates the system and method of the present invention for establishing an email thread and allowing other users to provide edits or annotations.

FIG. 6 illustrates the system and method 600 of the present invention having an email storage area 602 such that a user may send emails and retrieve email threads (at thread holder 608) which are established from users 604. Users 604 are allowed to provide edits/annotations to the thread at 606. The thread is then returned to the requester at 608. The requester may then delete (614), solicit entire email thread (612), request mature/incomplete email thread (616) or archive or save thread (620).

Figure 7:
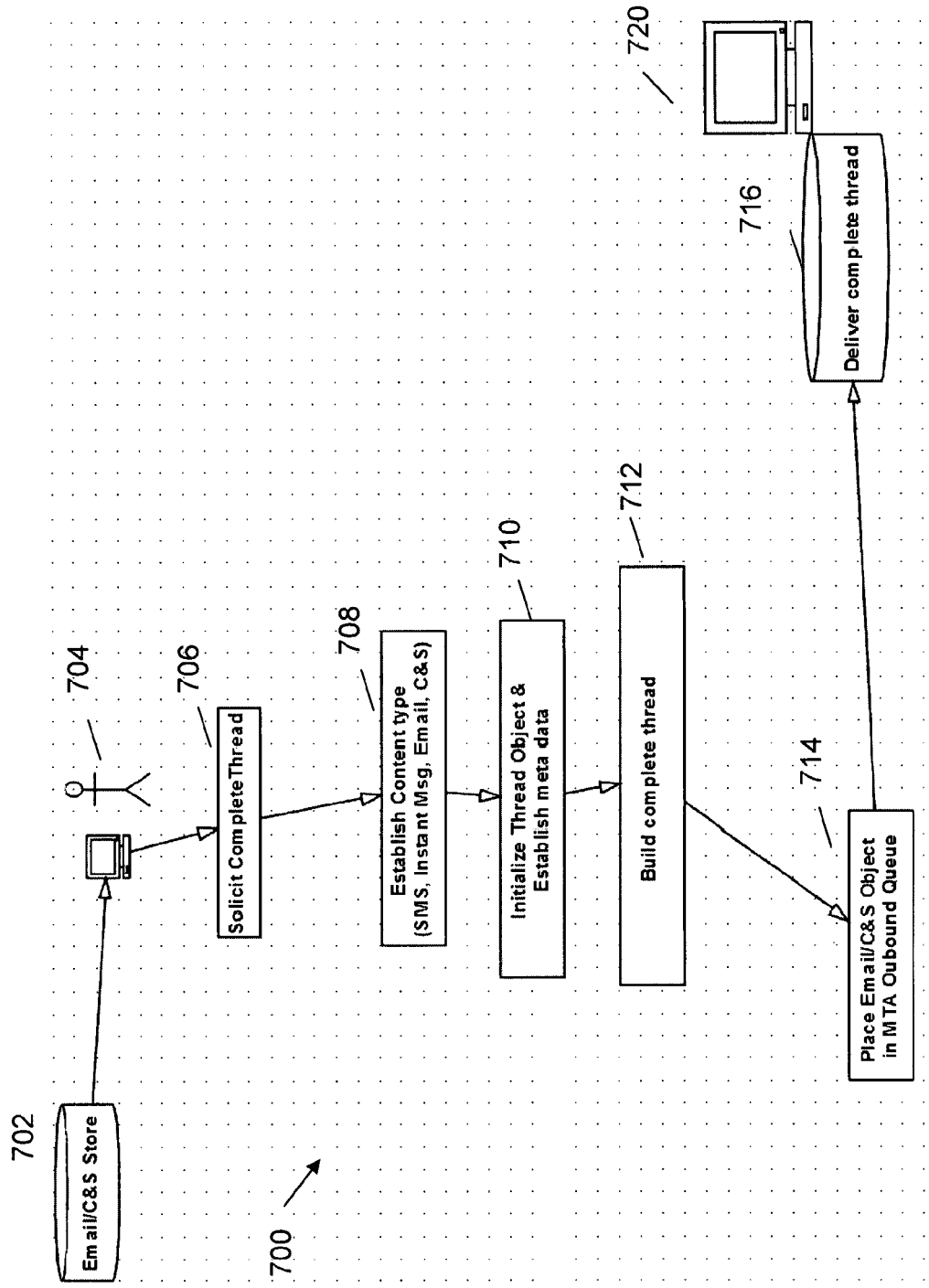
FIG. 7 illustrates the system and method of the present invention for building a complete thread.

FIG. 7 illustrates the system and method 700 of the present invention having an email storage area 702 such that a user 704 may send emails and retrieve email threads (at thread holder 702). At 706, user 704 solicits from the system the entire thread. At 708, the system determines the communication type (for instance, SMS, email, IM or C&S). (The Short Message Service (SMS), often called text messaging, is a means of sending short messages to and from mobile phones. Instant messaging (IM) is a form of real-time communication between two or more people based on typed text. The text is conveyed via computers connected over a network such as the Internet.) At 710, the thread data is initialized and metadata is established. At 712, the thread is rebuilt. At 714, the system and method places the email/SMS object in the MTA outbound queue and complete thread is delivered at 716 to user at 720.

Figure 8:
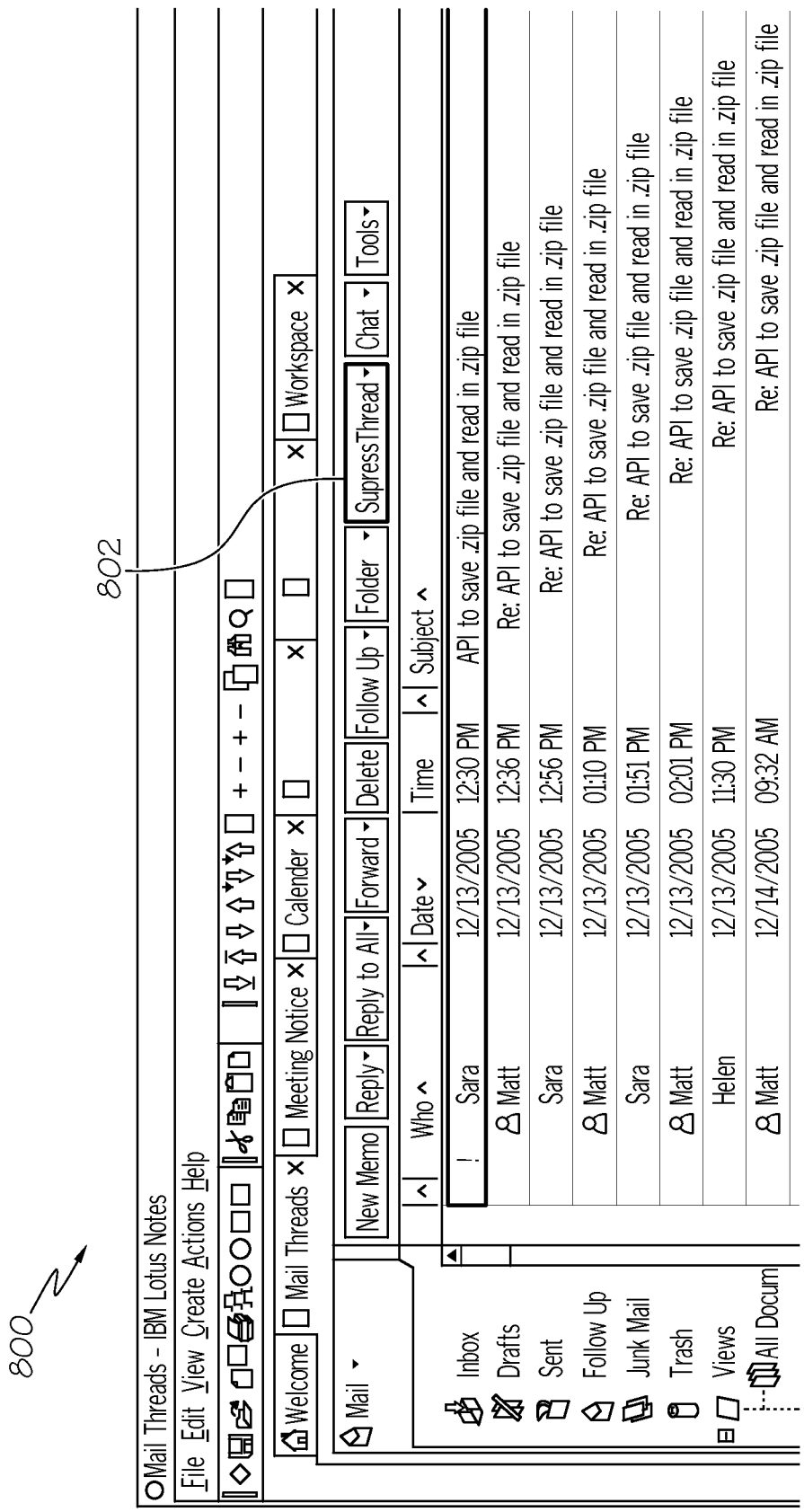
FIG. 8 illustrates the UI of the present invention showing the "Suppress Thread" UI element.

FIG. 8 illustrates the user interface 800 of the present invention illustrating the "Suppress Thread" button of the present invention for suppressing the thread. Likewise, the user interface 800 of the present invention may display a "Request Thread" button for requesting the thread.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

The invention claimed is:

1. A method, for use in a system where users exchange emails to create an email thread, for requesting and retrieving a complete email thread, the method comprising:

receiving a request for an email thread from a requesting email user;
    authenticating the requesting email user;
    retrieving the requested email thread for the requesting email user;
    conveying the requested email thread to the inbox of the requesting email user;
        removing the requested email thread from the user's inbox in response to receiving a suppress thread request from the requesting user via a suppress thread UI button; and
        adding the requesting user to an incomplete email thread, the adding comprising:
            receiving, from the requesting user, identification of another user on the incomplete email thread;
            receiving a thread request for the incomplete email thread from the requesting user via a request thread UI button;
            conveying the incomplete email thread to the requesting user; and
            conveying the thread request for the incomplete email thread to others in the incomplete thread.

2. The method of claim 1 further comprising allowing the others in the incomplete thread to review the incomplete thread and select one of "I agree", "I agree with comments", "I decline", "I decline with comments", "Ignore", and "Return the complete thread".

3. The method of claim 2 further comprising receiving an agreement with comments response from at least one of the others in the incomplete thread and, in response to the receiving of the agreement, mining data on a mail server and parsing out the complete thread to the requesting user's inbox.

4. The method of claim 3 wherein the mining includes mining data from all available parent and child threads of the incomplete thread.

* * * * *